United States Patent
Pandey et al.

(10) Patent No.: US 11,704,509 B2
(45) Date of Patent: Jul. 18, 2023

(54) METHOD AND ELECTRONIC DEVICE FOR DYNAMICALLY ASSOCIATING UWB TAG WITH OBJECT

(71) Applicant: Samsung Electronics Co., Ltd., Suwon-si (KR)

(72) Inventors: Kislay Pandey, Bengaluru (IN); Mugula Satya Shankar Kameshwar Sharma, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/728,366

(22) Filed: Apr. 25, 2022

(65) Prior Publication Data

US 2023/0045985 A1 Feb. 16, 2023

Related U.S. Application Data

(63) Continuation of application No. PCT/KR2022/095084, filed on Apr. 12, 2022.

(30) Foreign Application Priority Data

Jul. 28, 2021 (IN) .............................. 202141034016
Oct. 6, 2021 (IN) ............................. 2021 41034016

(51) Int. Cl.
 *G06K 7/10* (2006.01)
(52) U.S. Cl.
 CPC ................. *G06K 7/10306* (2013.01)
(58) Field of Classification Search
 CPC ........................ G06K 7/10306; G06Q 10/00
 See application file for complete search history.

(56) References Cited

U.S. PATENT DOCUMENTS

| | | | |
|---|---|---|---|
| 6,927,688 B2 * | 8/2005 | Tice ................... | G06K 7/10306 340/539.1 |
| 11,113,485 B2 * | 9/2021 | Madhusudhana ...... | G06V 10/17 |

(Continued)

FOREIGN PATENT DOCUMENTS

| CN | 111126520 A | 5/2020 |
|---|---|---|
| CN | 112098985 A | 12/2020 |
| WO | 2013/166096 A1 | 11/2013 |

OTHER PUBLICATIONS

International Search Report and Written Opinion dated Aug. 1, 2022, issued in International Application No. PCT/KR2022/095084.

(Continued)

*Primary Examiner* — Seung H Lee
(74) *Attorney, Agent, or Firm* — Jefferson IP Law, LLP

(57) ABSTRACT

A method for dynamically associating an ultra wide band (UWB) tag with an object by an electronic device is provided. The method includes monitoring, by the electronic device, a first object and a second object in vicinity of the UWB tag over a period of time and determining, by the electronic device, a parameter associated with each of the first object and the second object with respect to the UWB tag. Further, the method includes generating, by the electronic device, a correlation between the UWB tag and each of the first object and the second object based on the parameter and dynamically associating, by the electronic device, the UWB tag with one of the first object and the second object based on the correlation between the UWB tag and each of the first object and the second object.

18 Claims, 14 Drawing Sheets

(56) References Cited

U.S. PATENT DOCUMENTS

| | | |
|---|---|---|
| 2010/0001838 A1 | 1/2010 | Miodownik et al. |
| 2017/0023659 A1 | 1/2017 | Bruemmer et al. |
| 2018/0343397 A1* | 11/2018 | Chandrashekar ....... G01S 19/48 |
| 2019/0354735 A1 | 11/2019 | Madhusudhana et al. |
| 2020/0107164 A1 | 4/2020 | Lopatin et al. |
| 2020/0228943 A1 | 7/2020 | Martin et al. |
| 2020/0393555 A1 | 12/2020 | Kletsov et al. |
| 2021/0368952 A1* | 12/2021 | Chen .................... G05D 1/0016 |
| 2022/0210620 A1* | 6/2022 | Wahl ........................ G01S 5/10 |

OTHER PUBLICATIONS

Indian Examination Report dated Mar. 2, 2023, issued in Indian Application No. 202141034016.

* cited by examiner

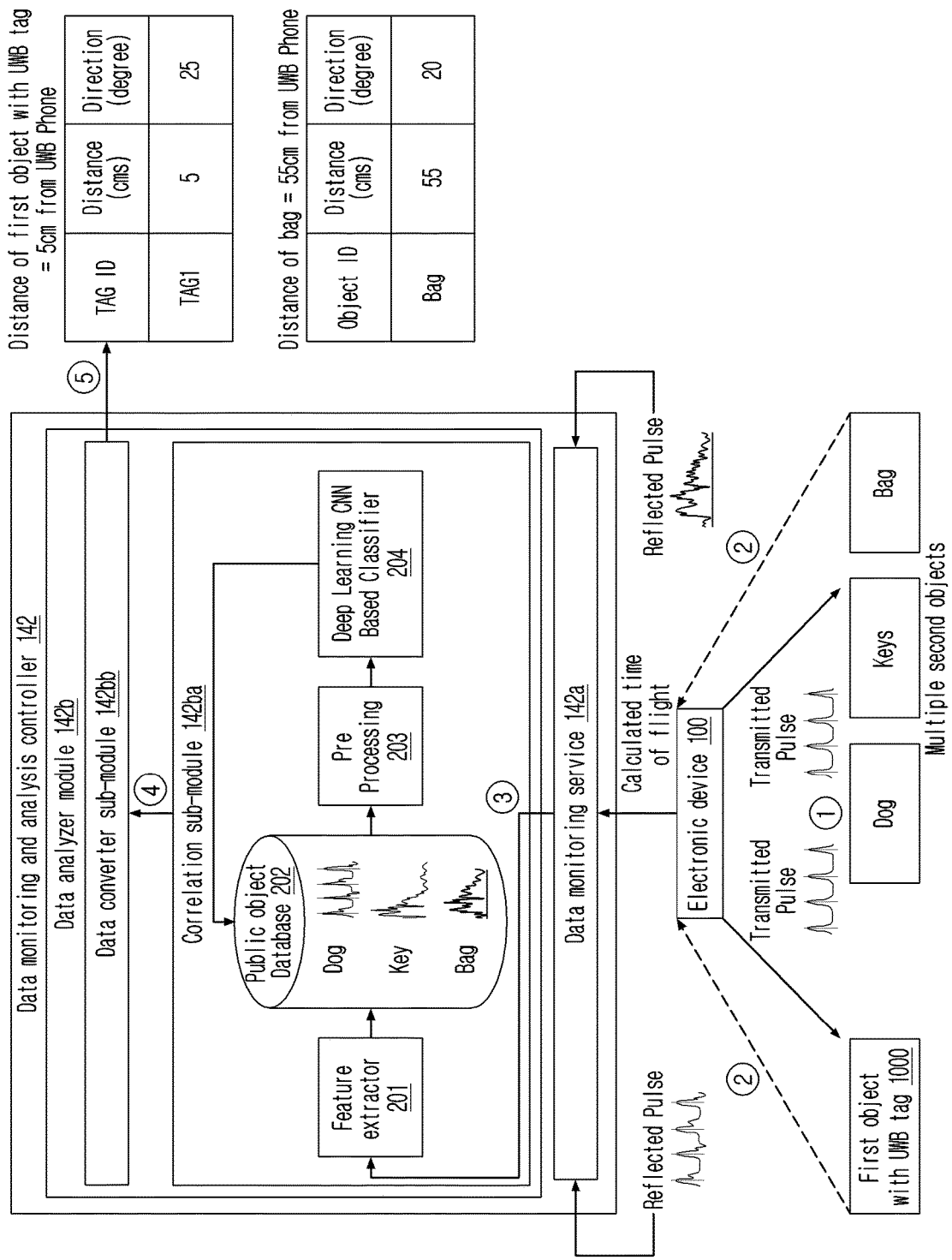

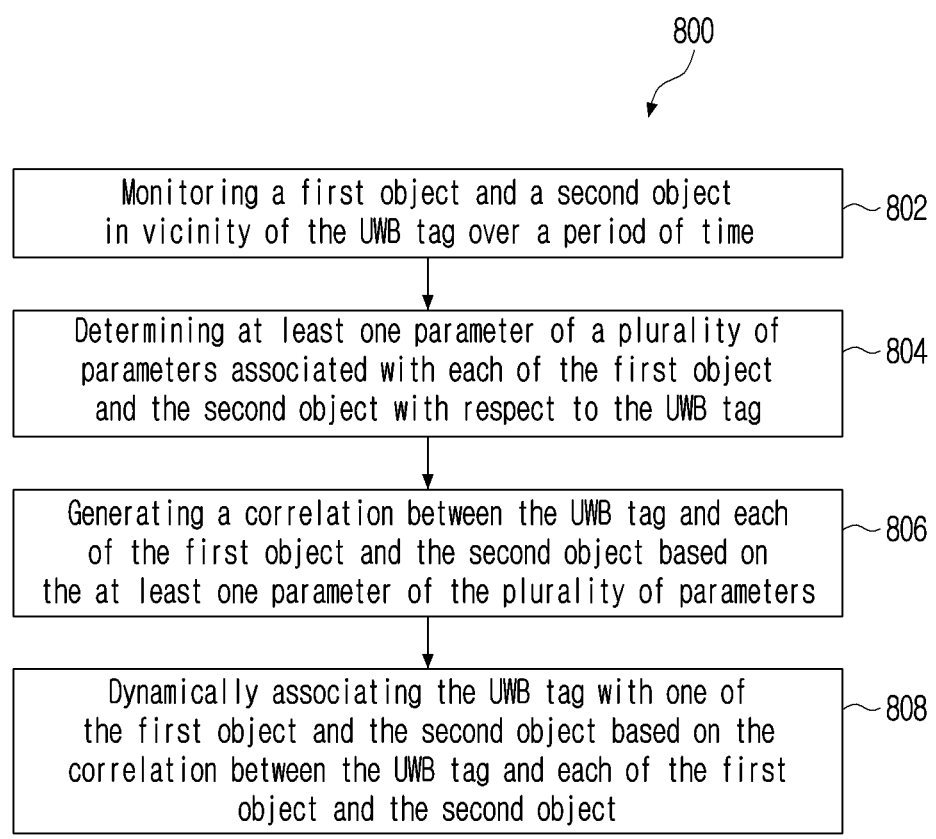

METHOD AND ELECTRONIC DEVICE FOR DYNAMICALLY ASSOCIATING UWB TAG WITH OBJECT

CROSS-REFERENCE TO RELATED APPLICATION(S)

This application is a continuation application, claiming priority under § 365(c), of an International application No. PCT/KR2022/095084, filed on Apr. 12, 2022, which is based on and claims the benefit of an Indian Provisional patent application number 202141034016, filed on Jul. 28, 2021, and of an Indian Complete patent application number 202141034016, filed on Oct. 6, 2021, in the Indian Intellectual Property Office, the disclosure of each of which is incorporated by reference herein in its entirety.

TECHNICAL FIELD

The disclosure relates to wireless communication. More particularly, the disclosure relates to a method and an electronic device for dynamically associating ultra wide band (UWB) tag with object.

BACKGROUND ART

With advancement in technology, various tag devices are used to track objects of daily use which have a possibility of being lost. The tag devices are usually attached to the objects which needs to be tracked and mapped using an application associated with the tag devices in an electronic device of the user. Therefore, the tag devices enable users to keep track of their belongings through their electronic devices and safeguard the objects from being stolen or lost. However, the tag devices are generally manually associated or dissociated from the objects which make the use of the tag devices tedious and time consuming.

For example, consider that a user attaches a tag device to luggage while travelling. In order to activate the tag device the user will have to setup the tag device using a tag device application on an electronic device manually. Once the tag device setup is completed, the tag device application maps the luggage to the tag device and the same is reflected on the tag device application. Once the user completed the travel and returns, the user may detach the tag device from the luggage and attach the tag device to a keychain. However, the tag device is still mapped to the luggage on the tag device application irrespective of the user attaching the tag device to the keychain. To reflect the tag device being attached to the keychain the user will have to manually change the setting on the tag device application all over again. Therefore, each time the user attaches the tag device to a new object the user will have to manually change the setting in the tag device application to map the tag device with the new object which is a time consuming and tedious process. Also, in case the user forgets to map the tag device to the new object in the tag device application, then there is no method by which the tag device will be mapped to the new object. Therefore, the whole purpose of using the tag device to track objects is defeated.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide a method and an electronic device for dynamically associating or dissociating an ultra wide band (UWB) tag with objects in vicinity of the electronic device without any human intervention. The dynamic association or dissociation of the UWB tag is done based on a correlation which is determined based on distance, angle, association time, etc. between the UWB tag and the objects in vicinity of the electronic device.

Additional aspects will be set forth in part in the description which follows and, in part, will be apparent from the description, or may be learned by practice of the presented embodiments.

Technical Solution

In accordance with an aspect of the disclosure, a method for dynamically associating an ultra wide band (UWB) tag with an object by an electronic device is provided. The method includes monitoring, by the electronic device, a first object and a second object in vicinity of the UWB tag over a period of time and determining, by the electronic device, at least one parameter of a plurality of parameters associated with each of the first object and the second object with respect to the UWB tag. The method includes generating, by the electronic device, a correlation between the UWB tag and each of the first object and the second object based on the at least one parameter of the plurality of parameters, and dynamically associating, by the electronic device, the UWB tag with the second object based on the correlation between the UWB tag and each of the first object and the second object.

In an embodiment, the at least one parameter of the plurality of parameters comprises a distance between the UWB tag and the first object, a distance between the UWB tag and the second object, a positional data of the first object with respect to the UWB tag, a positional data of the second object with respect to the UWB tag.

In an embodiment, monitoring, by the electronic device, the first object and the second object in vicinity of the UWB tag over the period of time includes determining, by the electronic device, the positional data of the first object with respect to the UWB tag and the positional data of the second object with respect to the UWB tag using UWB signals. Further, the method includes identifying, by the electronic device, the first object and the second object in the vicinity of the UWB tag using the determined positional data of the first object with respect to the UWB tag (1000) and the positional data of the second object with respect to the UWB tag (1000), and monitoring, by the electronic device, the first object and the second object in vicinity of the UWB tag over the period of time.

In an embodiment, generating, by the electronic device, the correlation between the UWB tag and each of the first object and the second object based on the at least one parameter of the plurality of parameters includes determining, by the electronic device (100), a rank each of the first object and the second object for association with the UWB tag (1000) based on the determined at least one parameter of the plurality of parameters, and generating, by the electronic device (100), the correlation between the UWB tag (1000)

and each of the first object and the second object based on the rank of each of the first object and the second object for association with the UWB tag (1000).

In an embodiment, dynamically associating, by the electronic device (100), the UWB tag (1000) with the second object based on the correlation between the UWB tag (1000) and each of the first object and the second object includes computing, by the electronic device (100), a proximity index value between the UWB tag (1000) and each of the first object and the second object based on the at least one parameter of the plurality of parameters with respect to the UWB tag (1000) and the correlation between the UWB tag (1000) and each of the first object and the second object. Further, the method includes determining, by the electronic device (100), a likelihood of association of the UWB tag (1000) with each of the first object and the second object based on the proximity index value between the UWB tag (1000) and each of the first object and the second object, and dynamically associating, by the electronic device (100), the UWB tag (1000) with the second object based on the likelihood of association.

In an embodiment, determining, by the electronic device, the positional data of the first object with respect to the UWB tag and the positional data of the second object with respect to the UWB tag using UWB signals includes transmitting, by the electronic device, a UWB radar pulse in the vicinity of the UWB tag and receiving, by the electronic device, a reflected UWB radar pulse from the first object and the second object. The method also includes computing, by the electronic device, a distance value measured from the electronic device, and a direction value measured from the electronic device using a time of flight value between the transmitted UWB radar pulse and the reflected UWB radar pulse and determining, by the electronic device, the positional data of the first object with respect to the UWB tag and the positional data of the second object with respect to the UWB tag using UWB signals.

In an embodiment, identifying, by the electronic device, the first object and the second object in the vicinity of the UWB tag using the using the determined positional data of the first object with respect to the UWB tag (1000) and the positional data of the second object with respect to the UWB tag (1000) includes extracting, by the electronic device, one or more features from a reflected UWB radar pulse from the first object and the second object and providing, by the electronic device, the one or more features as an input to a first pre-trained model. Further, the method also includes determining, by the electronic device, an identification value for the first object and the second object based on the output of the first pre-trained model, and identifying, by the electronic device, the first object and the second object in the vicinity of the UWB tag based on the identification value.

In an embodiment, computing, by the electronic device, the proximity index value between the UWB tag and the first object and the second object based on the positional data includes determining, by the electronic device, a first difference between the distance value of the UWB tag and the distance value of each of the object and the second object, wherein the first difference indicates a relative distance value. Further, the method also includes determining, by the electronic device, a second difference between the direction value of the UWB tag and the direction value of each of the first object and the second object, wherein the second difference indicates a relative direction value, and determining, by the electronic device, a time duration of association of the UWB tag with the first object, the second object and a previous updated time of the association and computing, by the electronic device (100), the proximity index value between the UWB tag (1000) and each of the first object and the second object based on the determined weighted average In an embodiment, determining, by the electronic device (100), the likelihood of association of the UWB tag (1000) with each of the first object and the second object based on the proximity index includes providing, by the electronic device (100), the positional data of the UWB tag (1000), the positional data of the one or more physical objects, the identification value of the one or more physical objects, and an association history of the UWB tag (1000) as an input to a second pre-trained model, and determining, by the electronic device (100), the likelihood of association of the UWB tag (1000) with each of the one or more physical objects by the second pre-trained model.

In an embodiment, dynamically associating, by the electronic device, the UWB tag with one of the first and the second object based on the correlation between the UWB tag and each of the first object and the second object includes detecting, by the electronic device, an absence of association of the first object with the UWB tag, and dynamically associating, by the electronic device, the UWB tag with the second object with the highest rank.

In an embodiment, the method further includes obtaining, by the electronic device, an identification value of one of the first object and the second object associated with the UWB tag. The method also includes identifying, by the electronic device, an absence of one of the first object and the second object which is currently associated with the UWB tag based on the rank and the proximity index value, and dynamically dissociating, by the electronic device, one of the first object and the second object which is currently associated with the UWB tag (1000).

In an embodiment, dynamically associating, by the electronic device, the UWB tag with one of the first and the second object based on the correlation between the UWB tag and each of the first object and the second object includes obtaining, by the electronic device, an identification value of one of the first object and the second object which is currently associated with the UWB tag (1000) and identifying, by the electronic device, whether the identification value of one of the first object and the second object which is currently associated with the UWB tag (1000) is same or different as the identification value of a physical object with a highest rank. The method also includes determining, by the electronic device, the dis-association of the UWB tag with one of the first object and the second object which is currently associated with the UWB tag (1000), and determining, by the electronic device, the dis-association of the UWB tag with one of the first object and the second object which is currently associated with the UWB tag (1000). Further, the method includes dynamically associating, by the electronic device (100), the UWB tag (1000) with the physical object with the highest rank, wherein the physical object with the highest rank is one of the first object and the second object which is currently not associated with the UWB tag (1000).

In an embodiment, the method further includes providing, by the electronic device, a notification to a user indicating the association of the UWB tag (1000) with the physical object with the highest rank and the dis-association of the UWB tag (1000) with one of the first object and the second object which is currently associated with the UWB tag (1000). The method also includes receiving, by the electronic device (100), a user input comprising a validation of the association of the UWB tag (1000) with the physical object with the highest rank and the dis-association of the UWB tag (1000) with one of the first object and the second object which is currently associated with the UWB tag (1000), and updating, by the electronic device, at least one of the association of the UWB tag and the dis-association of the UWB tag based on the user input.

In accordance with another aspect of the disclosure, an electronic device for dynamically associating an ultra-wide band (UWB) tag with an object is provided. The electronic device includes a memory, a processor, a communicator and an UWB tag management controller. The UWB tag management controller is configured to monitor a first object and a second object in vicinity of the UWB tag over a period of time and determine at least one parameter of a plurality of parameters associated with each of the first object and the second object with respect to the UWB tag (1000). Further, the UWB tag management controller is configured to generate a correlation between the UWB tag and each of the first object and the second object based on the at least one parameter of the plurality of parameters and dynamically associate the UWB tag with one of the first object and the second object based on the correlation between the UWB tag and each of the first object and the second object.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIG. 2 illustrates a working of the data monitoring and analysis controller, according to an embodiment of the disclosure;

FIG. 8 is a flow chart illustrating a method for dynamically associating the UWB tag with the object, according to an embodiment of the disclosure;

The same reference numerals are used to represent the same elements throughout the drawings.

MODE FOR INVENTION

Figure 1A:
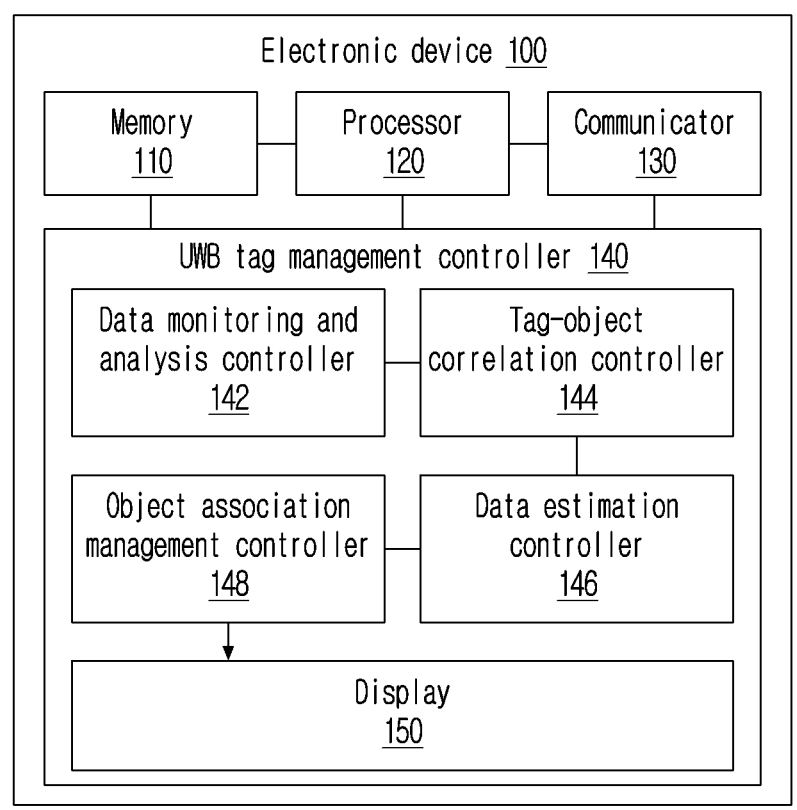
FIG. 1A illustrates a block diagram of an electronic device for dynamically associating an ultra wide band (UWB) tag with an object, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly the embodiments herein disclose a method for dynamically associating an ultra wide band (UWB) tag with an object by an electronic device. The method includes monitoring, by the electronic device, a first object and a second object in vicinity of the UWB tag over a period of time and determining, by the electronic device, at least one parameter of a plurality of parameters associated with each of the first object and the second object with respect to the UWB tag (1000). The method includes generating, by the electronic device, a correlation between the UWB tag and each of the first object and the second object based on the at least one parameter of the plurality of parameters; and dynamically associating, by the electronic device, the UWB tag with one of the first and the second object based on the correlation between the UWB tag and each of the first object and the second object.

Accordingly the embodiments herein disclose an electronic device for dynamically associating an ultra-wide band (UWB) tag with an object. The electronic device includes a memory, a processor, a communicator and an UWB tag management controller. The UWB tag management controller is configured to monitor a first object and a second object in vicinity of the UWB tag over a period of time and determine at least one parameter of a plurality of parameters associated with each of the first object and the second object with respect to the UWB tag (1000). Further, the UWB tag management controller is configured to generate a correlation between the UWB tag and each of the first object and the second object based on the at least one parameter of the plurality of parameters and dynamically associate the UWB tag with one of the first and the second object based on the correlation between the UWB tag and each of the first object and the second object.

In the conventional methods and systems, camera is required to associate a tag with an object. The use of the camera may not be feasible as the cameras cannot be installed across locations where the user carries the tags.

Conventional methods and systems do not provide a dynamic method to dissociate the tags from objects which are no longer in the vicinity of the electronic device of the user. Therefore, allows unnecessary and sometimes unrelated objects being associated with the tags even after the user has detached the tag from the object.

Unlike to the conventional methods and systems, the proposed method includes intelligently and automatically attaching a new object to the tag device based on the proximity of the new object to the tag device. As a result, when the user detaches the tag device from an existing object and attaches the tag device to the new object, the user need not manually setup the new object mapping with the tag device. The electronic device dynamically and automatically determines that the proximity of the tag device and the new object; and the existing objects. Further, the electronic device dissociates the tag device from the existing object and associated the tag device with the new object without any manual intervention.

Therefore, the proposed method provides fast, easy and seamless association and dissociation of the tag device from the objects based on the identification of the objects and proximity of the identified objects with respect to the tag device and the electronic device.

Referring now to the drawings and more particularly to FIGS. 1A, 1B, 2, 3, 4, 5, 6A, 6B, 7, 8, 9A, 9B, 10A, and 10B, where similar reference characters denote corresponding features consistently throughout the figure, these are shown preferred embodiments.

Figure 1B:
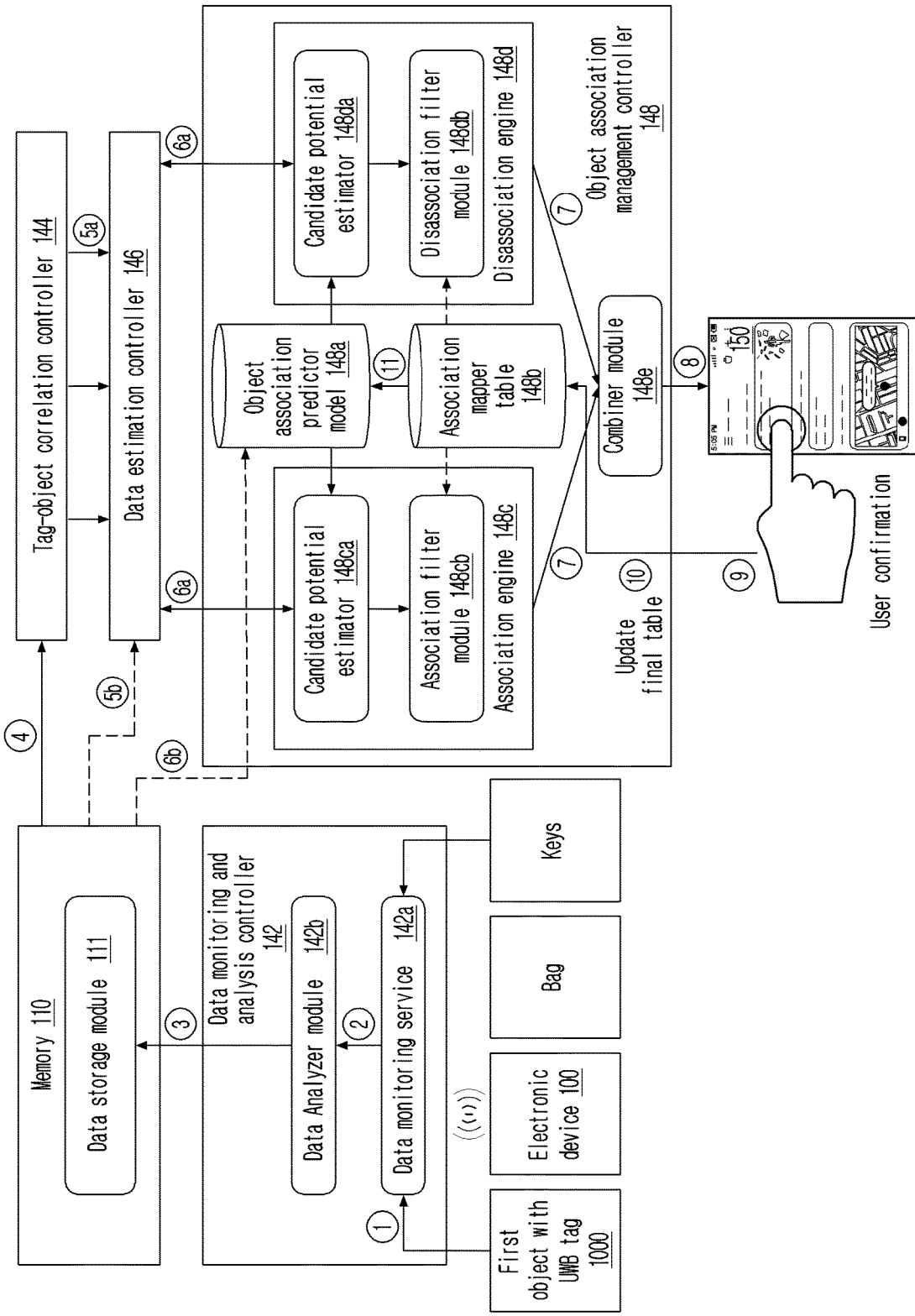
FIG. 1B illustrates a step-by-step procedure followed by each hardware components of the electronic for dynamically associating the UWB tag with the object, according to an embodiment of the disclosure.

FIGS. 1A and 1B illustrate a block diagram of an electronic device (100) for dynamically associating an ultra-wide band (UWB) tag (1000) with an object, according to various embodiments of the disclosure.

Referring to FIG. 1A, the electronic device (100) is an ultra-wide band (UWB) signal generating capable device with a UWB radar sensor. The electronic device (100) can be, but not limited to a laptop, a palmtop, a desktop, a mobile phone, a smart phone, Personal Digital Assistant (PDA), a tablet, a wearable device, an Internet of Things (IoT) device, a virtual reality device, a foldable device, a flexible device and an immersive system. The UWB tag (1000) is a tag which is capable of receiving and transmitting UWB signal and can be attached to the object.

In an embodiment, the electronic device (100) includes a memory (110), a processor (120), a communicator (130), a UWB tag management controller (140) and a display (150).

The memory (110) includes a data storage module (111) and the data storage module (111) comprises a tag data table and an object data table. The tag data table includes data schema with details such as an identification of the UWB tags (1000), a distance between the electronic device (100) and the UWB tags (1000), a direction (in angles) of the UWB tags (1000) with respect to the electronic device (100), etc. The object data table includes data schema with details such as an identification of multiple objects in the vicinity of the electronic device (100), a distance between the electronic device (100) and the multiple objects in the vicinity of the electronic device (100), a direction (in angles) of the multiple objects with respect to the electronic device (100), etc. Further, the memory (110) also stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) can be configured to store larger amounts of information. In certain examples, a non-transitory storage medium may store data that can, over time, change (e.g., in Random Access Memory (RAM) or cache).

The processor (120) communicates with the memory (110), the communicator (130), the UWB tag management controller (140) and the display (160). The processor (120) is configured to execute instructions stored in the memory (110) and to perform various processes. The processor may include one or a plurality of processors, may be a general purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (130) includes an electronic circuit specific to a standard that enables wired or wireless communication. The communicator (130) is configured to communicate internally between internal hardware components of the electronic device (100) and with external devices via one or more networks.

In an embodiment, the UWB tag management controller (140) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors. The UWB tag management controller (140) comprises a data monitoring and analysis controller (142), a tag-object correlation controller (144), a data estimation controller (146) and an object association management controller (148).

The data monitoring and analysis controller (142) includes a data monitoring service (142a) and a data analyzer module (142b). In an embodiment, the data monitoring and analysis controller (142) is configured to monitor a first object and a second object in vicinity of the UWB tag (1000) over a period of time and determine multiple parameters associated with each of the first object and the second object. The multiple parameters include for example but are not limited to a distance between the UWB tag (1000) and the first object, a distance between the UWB tag (1000) and the second object, a positional data of the first object with respect to the UWB tag (1000), or a positional data of the second object with respect to the UWB tag (1000).

In an embodiment, the tag-object correlation controller (144) is configured to generate a correlation between the UWB tag (1000) and the first object. Similarly, the tag-object correlation controller (144) is configured to generate a correlation between the UWB tag (1000) and the second object based on the multiple parameters. The correlation includes generating multiple relative correlation parameters for the UWB tag (1000) and each of the first object and the second object.

In an embodiment, the data estimation controller (146) is configured to generate a proximity index value between the UWB tag (1000) and each of the first object and the second object based on the relative correlation parameters.

In an embodiment, the object association management controller (148) includes an object association predictor model (148a), an association mapper table (148b), an association engine (148c), a disassociation engine (148d) and a combiner module (148e). The object association management controller (148) is configured to identify an absence of one of the first object and the second object to which the UWB tag (1000) is currently attached to, in the vicinity of the UWB tag (1000) based on the proximity index value and dynamically dis-associate the UWB tag (1000) from one of the first object and the second object to which the UWB tag (1000) is currently attached. Similarly, the object association management controller (148) is configured to identify an absence of say the first object in the vicinity of the UWB tag (1000) but identifies the presence of the second object in the vicinity of the UWB tag (1000) based on the proximity index value and dynamically associates the UWB tag (1000) to the second object. Further details of the each of the components is explained from FIGS. 1B, 2, 3, 4, 5, 6A, 6B, 7, and 8. In an embodiment, the dynamic association or dis-association of the UWB tag (1000) may be confirmed by a user by providing an input on a notification displayed by the electronic device (100). The notification is used as an example and includes without being limited to notification, pop-up window, etc. comprising at least one of text, images, videos, GIFs, etc. indicating the dynamic association or dis-association of the UWB tag (1000) which needs to be confirmed by the user. The user input may be provided in the form of touch, swipe, gestures, voice, etc.

At least one of the plurality of modules/components of the UWB tag management controller (140) may be implemented through an AI model. A function associated with the AI model may be performed through memory (110) and the processor (120). The one or a plurality of processors controls the processing of the input data in accordance with a predefined operating rule or the AI model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

The display (150) is configured to display the notification to the user indicating the association of the UWB tag (1000) with one of the first object and the second object which is in the vicinity of the UWB tag (1000) and is currently not associated with the UWB tag (1000). The notification is also provided to the user indicating the dis-association of the UWB tag (1000) with one of the first object and the second object with which the UWB tag (1000) is currently attached. The notification comprises actionable elements to receive the user input confirming the association of the UWB tag (1000) or the dis-association of the UWB tag (1000) with one of the first object and the second object. The display (150) is capable of receiving inputs and is made of one of liquid crystal display (LCD), light emitting diode (LED), organic light-emitting diode (OLED), etc.

Although the FIG. 1A shows various hardware components of the electronic device (100) but it is to be understood that other embodiments are not limited thereon. In other embodiments, the electronic device (100) may include a greater or lesser number of components. Further, the labels or names of the components are used only for illustrative purpose and does not limit the scope of the disclosure. One or more components can be combined together to perform same or substantially similar function to dynamically associating the UWB tag (1000) with the object by the electronic device (100).

FIG. 1B illustrates a step-by-step procedure followed by each of the hardware components of the electronic device (100) for dynamically associating the UWB tag (1000) with the object, according to an embodiment of the disclosure.

Referring to the FIG. 1B, consider that the electronic device (100) acts as a UWB transmitter and transmits UWB signals towards the objects in the vicinity of the electronic device (100). At step 1, the data monitoring service (142a) of the electronic device (100) receives the UWB positional data from the first object to which the UWB tag (1000) and UWB radar positional data from at the second objects which are present in the vicinity of the electronic device (100). At step 2, the data monitoring service (142a) sends the received raw data to the data analyzer module (142b). The data analyzer module (142b) is configured to identify that the UWB tag (1000) is attached to one of the first object and the second object which is present in the vicinity of the electronic device (100) based on the received raw data. At step 3, the data analyzer module (142b) converts the identified first object and the second object, the UWB tag (1000), etc. to representational data and stores in the data storage module (111) of the memory (110). In the data storage module (111) the representational data is stored in the form of tables.

At step 4, the data storage module (111) sends an indication to the tag-object correlation controller (144) that the storage is updated with new data. At step 5a, the tag-object correlation controller (144) determines the relative correlation parameters for each of the (TAG, Object) pairs in the data storage module (111). The relative correlation parameters for each of the (TAG, Object) pairs includes but may not be limited to relative distance, relative direction, association duration and the last updated time. Further, the tag-object correlation controller (144) sends the relative correlation parameters determined to the data estimation controller (146). The data estimation controller (146) also receives the information about the (TAG, Object) pairs from the memory (110) (step 5b). Further, the data estimation controller (146) determines the proximity index value between the UWB tag (1000) and the first object and the second object based on the inputs received at step 5a and the step 5b, and identifies the potential candidates i.e., the potential objects to which the UWB tag (1000) can be associated or dissociated.

At step 6a, the data estimation controller (146) sends the identified potential candidates to the association engine (148c) and the dissociation engine (148d). At step 6b, the object association predictor model (148a) receives the information about the (TAG, Object) pairs from the memory (110) (step 6b). At step 7, each of the association engine (148c) and the dissociation engine (148d) sends the update about the new associations/disassociations to the combiner module (148e).

At step 8, the combiner module (148e) sends the association/dissociation suggestion to listening services on the electronic device (100) which is provided on the display (150) in the form of the notification. At step 9, the electronic device (100) receives the user input confirming the association/dissociation suggestion and at step 10, an association mapper table (148b) is updated based on the user confirmation. Also at step 11, the association mapper table (148b) shares the final update of the association information with an object association predictor model (148a) and also each of association filter module (148cb) of the association engine (148c) and disassociation filter module (148db) of the dissociation engine (148d). Therefore, the association suggestion not only enables the association or dissociation of the UWB tag (1000), but also updates the object association predictor model (148a) which helps in predicting the future association or dissociation of the UWB tag (1000).

FIG. 2 illustrates a working of the data monitoring and analysis controller (142), according to an embodiment of the disclosure.

Referring to the FIG. 2, the data monitoring and analysis controller (142) includes the data monitoring service (142a) and the data analyzer module (142b). The data monitoring service (142a) obtains UWB positional data of the devices comprising the UWB tag (1000) and other physical objects within the UWB range through periodic polling.

At step 1, the electronic device (100) which acts as both the UWB signal transmitter and receiver, sends the UWB pulse to each of the first object which comprises the UWB tag (1000) and the multiple second objects in the vicinity of the electronic device (100). The multiple second objects in the vicinity of the electronic device (100) here include the dog, the bag, the keys, etc. At step 2, the data monitoring service (142a) receives the reflected UWB pulses of positional data of each of the first object and the multiple second objects along with calculated time of flight with respect to each of the objects. The updates in data of the first object with the UWB tag (1000) and periodic polling act as trigger points for the data monitoring service (142a). The time of flight (ToF) methods rely on measuring the time it takes for the radio waves to travel a distance in the air. As radio waves travel at speed of light, the distances are calculated from the time measures.

At step 3 the data monitoring service (142a) sends the received data to a correlation sub-module (142ba) of the data analyzer module (142b). The correlation sub-module (142ba) includes a feature extractor (201), a public object database (202), a pre-processor (203) and a first pre-trained model which is a deep learning CNN based classifier (204). In the correlation sub-module (142ba), the received data is passed through the feature extractor (201) to determine features of each of the first object and the multiple second objects and stores the extracted features in the public object database (202). Further, the extracted features are prepared for the deep learning CNN based classifier (204) by passing the extracted features through the pre-processor (203). Then the pre-processed extracted features are passed through the deep learning CNN based classifier (204) which classifies the extracted features and identifies both the first object with the UWB tag (1000) and the multiple second objects in the proximity of the electronic device (100) along with positional attributes (distance/direction) of the objects. Then, a pre-defined radius (example 1 meter) and direction are used to identify physical objects which are present in the vicinity of the UWB tag (1000). For example, the first object with the UWB tag (1000) is identified as TAG1. For example, the multiple second objects identified as key, pet, bag, and table.

Further, the classified object data is also stored in the public object database (202). At step 4, the data converter sub-module (142bb) converts the identified object data into representational form which can be interpreted by other modules and easily stored in data tables. At step 5, the data schema is provided as distance (X) (unit: centimeters) and direction (Angle) (unit: degrees).

For example, consider that a distance of the first object with first UWB tag (1000a) is 5 cm from the electronic device (100). Then, the representational data is provided as in Table 1:

TABLE 1

| TAG ID | Distance (cms) | Direction (degree) |
|---|---|---|
| TAG1 | 5 | 25 |

For example, consider that a distance of the second object say the bag is 55 cm from the electronic device (100). Then, the representational data is provided as in Table 2:

TABLE 2

| Object ID | Distance (cms) | Direction (degree) |
|---|---|---|
| Bag | 55 | 20 |

Figure 3:
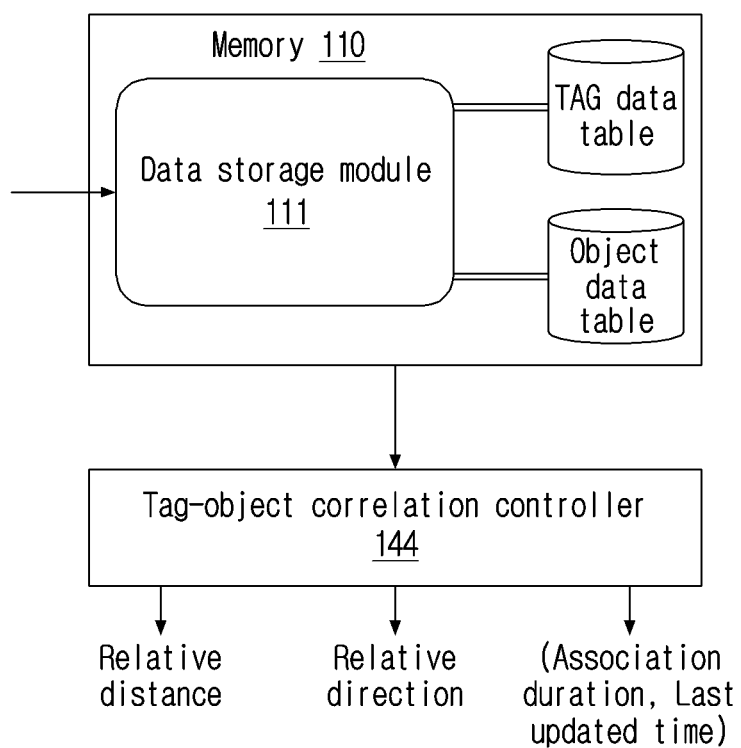
FIG. 3 illustrates a data storage module for storing the identified object and tag data, according to an embodiment of the disclosure.

FIG. 3 illustrates the data storage module (111) for storing the identified object and tag data, according to an embodiment of the disclosure.

Referring to the FIG. 3, the input to the data storage module (111) is the data translated to representational form by the data monitoring and analysis controller (142). The data storage module (111) is used by other modules to get access to data and perform analysis as and when required. The object is stored in the data storage module (111) in the form of tables i.e., an object data table stores the data related to all the multiple second objects and a TAG data table stores the data related to the TAG devices (example the first object).

The object data table is as provided in example Table 3 and the TAG data table is provided in example Table 4.

TABLE 3

| Object ID | Distance (cms) | Direction (degree) |
|---|---|---|
| Key | 8 | 35 |
| Pet | 12 | 25 |
| Table | 17 | 30 |
| Bag | 20 | 55 |

TABLE 4

| TAG ID | Distance (cms) | Direction (degree) |
|---|---|---|
| TAG1 | 5 | 25 |

Further, the data stored in the updated TAG data table and the object data tables are provided as input to the tag-object correlation controller (144). The tag-object correlation controller (144) identifies the correlation between attributes (distance/direction/time) for the TAG object pairs. The tag-object correlation controller (144) measures association duration, i.e., duration for which (Tag, object) pair remains within range and eligible for association and last updated time (time difference between the current time and last time when (TAG, object) pair was detected within range. The tag-object correlation controller (144) analyzes data sets at different time instances dynamically based on the movement of the TAG devices/the electronic device (100). The output of the tag-object correlation controller (144) provides relative distance, relative direction and association duration with last updated time between the UWB tag (1000) and each of the second objects in the vicinity of the electronic device (100) as shown in Table 5.

TABLE 5

| (TAG, Object) Pair | Relative distance (cms) | Relative direction (degree) | (Association duration, Last updated time) |
|---|---|---|---|
| (TAG1, Key) | 3 | 25 | (1 day, 10 m ago) |
| (TAG1, Pet) | 7 | 15 | (7 hours, 25 m ago) |
| (TAG1, Table) | 12 | 20 | (5 hours, 28 m ago) |
| (TAG1, Bag) | 15 | 45 | (1 hour, 2 days ago) |

The relative distance indicates difference in distance values between each TAG and object pair Similar for relative direction. The association duration represents the amount of time for which the TAG device and the object were identified to be within range and the last updated time represents the last time instance when both TAG and object were identified within range ('h' represents hours, 'm' represents minutes).

Figure 4:
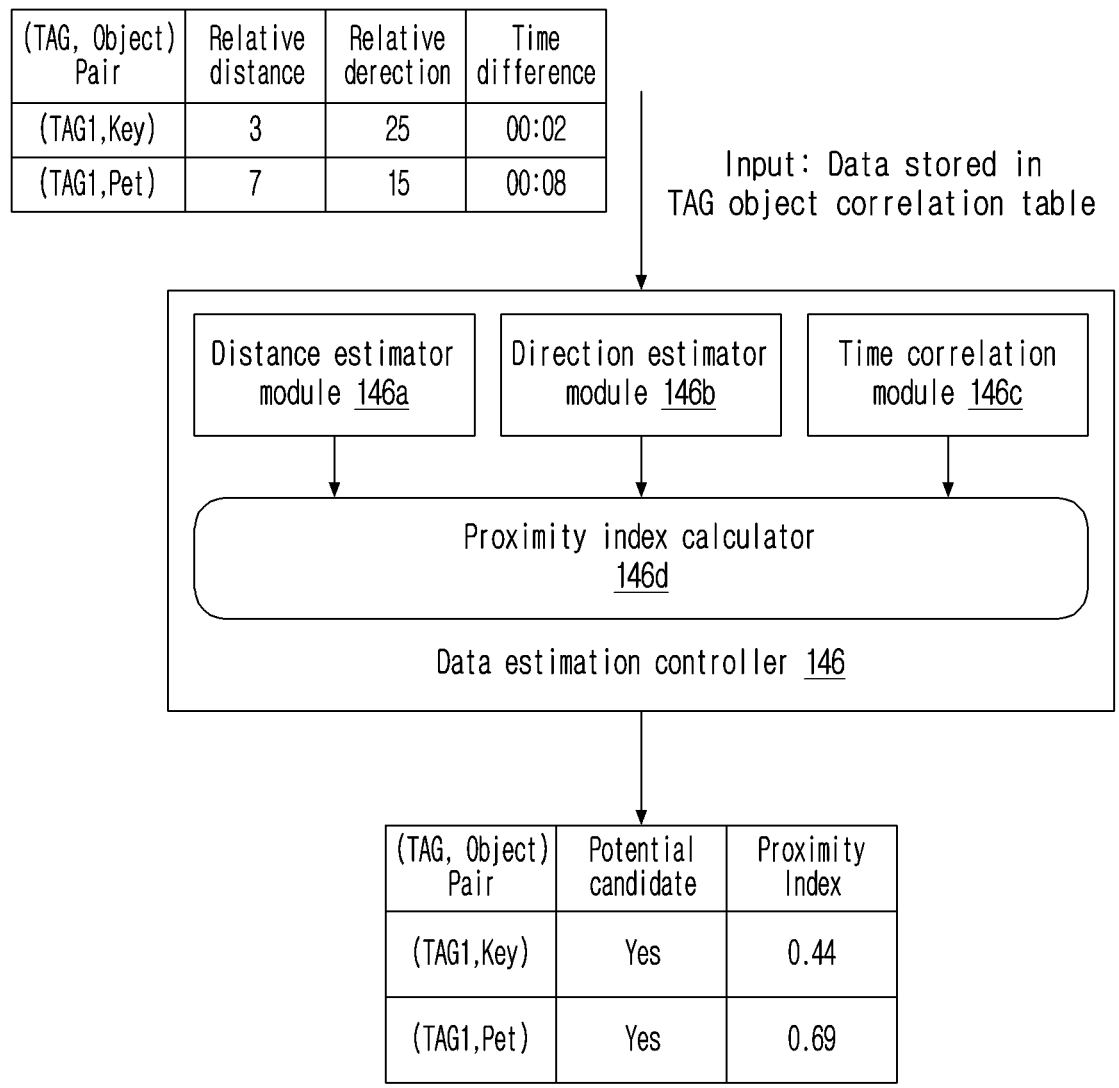
FIG. 4 illustrates the working of a data estimation controller, according to an embodiment of the disclosure.

FIG. 4 illustrates the working of the data estimation controller (146), according to an embodiment of the disclosure.

Referring to the FIG. 4, the data estimation controller (146) includes a distance estimator module (146a), a direction estimator module (146b), a time correlation module (146c) and a proximity index calculator (146d). The data estimation controller (146) identifies potential candidates using threshold values set in each of the distance estimator module (146a), the and direction estimator module (146b), the time correlation module (146c) such as for example distance threshold is 12 centimeters, the direction threshold is 30 degrees and the last updated time is less than 30 minutes.

Further, the proximity index calculator (146d) determines the proximity index for each of the second objects with respect to the UWB tag (1000) using candidate pairs which satisfy the threshold metric. The proximity index is a weighted average of the relative distance, the relative direction and a function of the time duration of association and the previous updated time of the association for each pair of the UWB tag (1000) and the second objects. Formula used for calculating the proximity index value:

$$PI(TAG, object) = (\alpha * \text{Normalized relative distance} + \beta * \text{Normalized relative direction} + \text{function}(\text{association duration}, \text{last updated time}))/3$$

Where, $\alpha$ is a weight of a distance parameter, $\beta$ is a weight of a direction parameter, function (association duration, last updated time) gives a correlation value (0-1) between association duration and last updated time value, normalized relative distance is Relative distance/Distance threshold, and normalized relative direction is Relative direction/Direction threshold. The proximity index values range between 0-1, with lower values indicating better association potential of the candidate pair, as indicated in Table 6.

TABLE 6

| (TAG, Object) Pair | Potential candidate | Proximity Index |
|---|---|---|
| (TAG1, Key) | Yes | 0.44 |
| (TAG1, Pet) | Yes | 0.69 |

Figure 5:
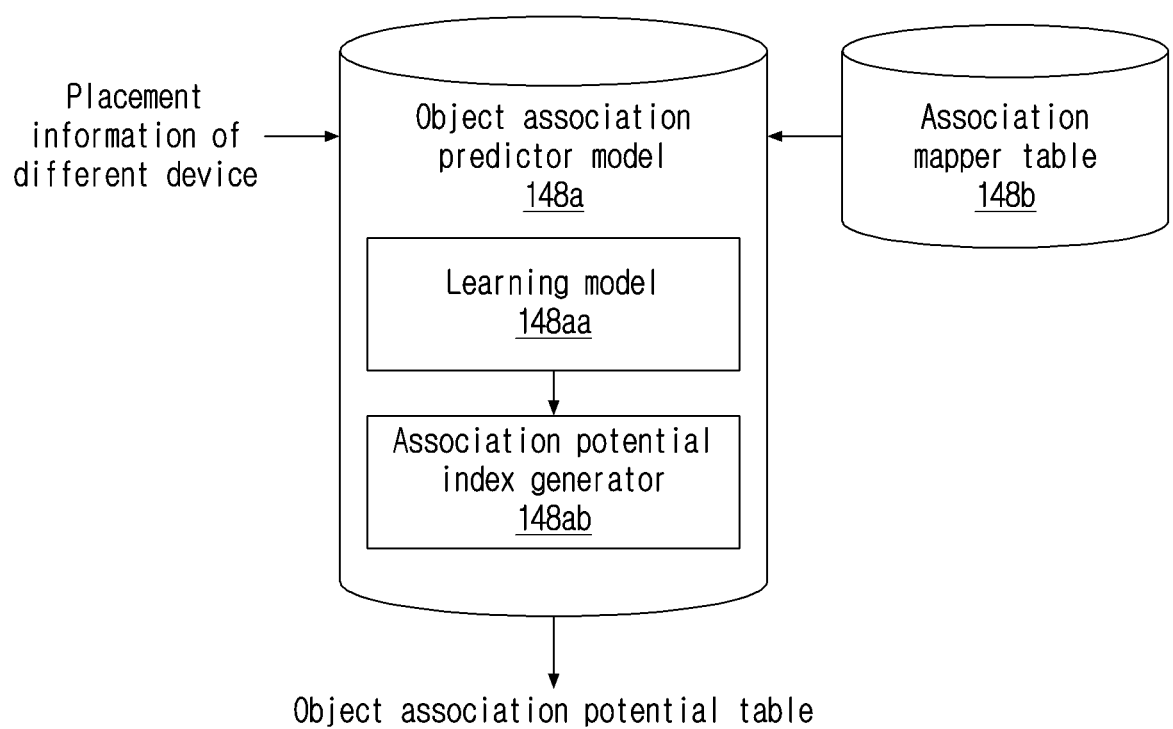
FIG. 5 illustrates the working of an object association predictor model, according to an embodiment of the disclosure.

FIG. 5 illustrates the working of the object association predictor model (148a), according to an embodiment of the disclosure.

Referring to the FIG. 5, the object association predictor model (148a) is the second pre-trained model which includes a learning model (148aa) and an association potential index generator (148ab). The object association predictor model (148a) receives inputs of the positional data of the UWB tag (1000), the positional data of the multiple second objects, the identification value of the multiple second objects, and the association history of the UWB tag (1000) from the association table data when (TAG, object) mappings are updated from the association mapper table (148b). The learning model (148aa) analyzes the inputs received from the two sources such as time movement of associated/disassociated pairs and physical objects over a period of time.

The association potential index generator (148ab) generates an association potential index for different objects and tags indicating a suitability of each of the multiple second objects for association with the TAG1 based on the analysis of the learning model (148aa) which is provided as rank. This feedback is shared with the association engine (148c) and the disassociation engine (148d) to identify association patterns and objects having low/high association potential. The output of the object association predictor model (148a) is the object association potential table as indicated in Table 7.

TABLE 7

| Object | Association potential |
|---|---|
| Table | Low |
| Key | High |

Therefore, the object association predictor model (148a) analyzes the user's association/disassociation patterns and updates the potential index for the objects dynamically.

Figure 6A:
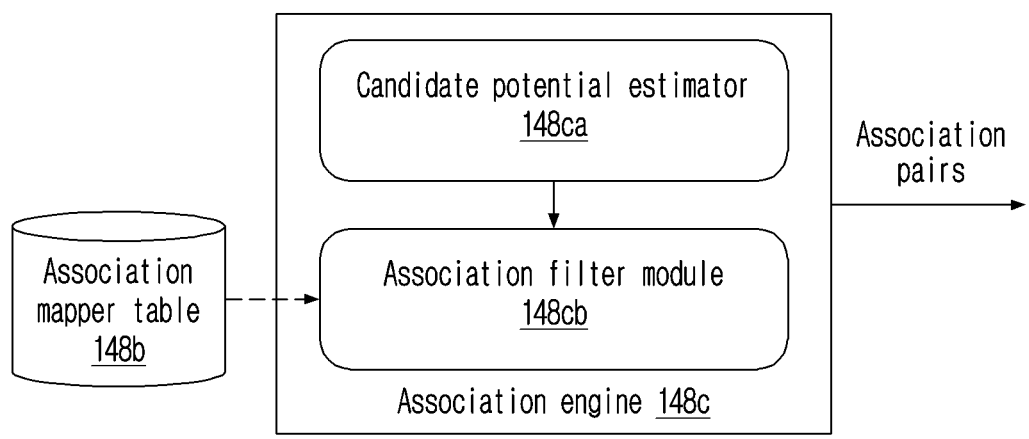
FIG. 6A illustrates the working of an association engine, according to an embodiment of the disclosure.

FIG. 6A illustrates the working of the association engine (148c), according to an embodiment of the disclosure.

Referring to the FIG. 6A, the association engine (148c) includes a candidate potential estimator (148ca) and an association filter module (148cb). The candidate potential estimator (148ca) receives the data from the learning model (148aa) and the potential candidates table from the data estimation controller (146), The candidate potential estimator (148ca) is configured to determine an intersection of the two input data sets and generates the final candidate list. The generated list is sorted based on proximity index (distance/direction/time).

Further, the association filter module (148cb) receives input from the association mapper table (148b) and is configured to determine the most promising candidates based on the previous list by applying a proximity index filter. The proximity index filter values change dynamically based on input data. The output of the association engine (148c) is association pairs of objects and the UWB tags. For example, an association pair associating TAG 2 and the bag is provided as (TAG2, Bag). Similarly, another association pair may be (TAG1, Pet). The association filter module (148cb) module filters out the most promising candidate pairs (TAG, object) for association and forwards the result. The association filter module (148cb) references the association mapper table (148b) to check for existing mappings to avoid duplication.

Figure 6B:
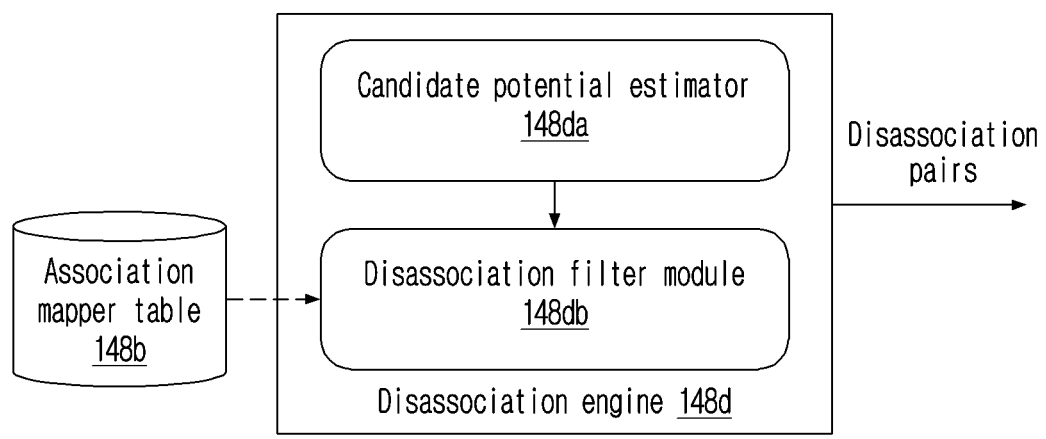
FIG. 6B illustrates the working of a disassociation engine, according to an embodiment of the disclosure.

FIG. 6B illustrates the working of the disassociation engine (148d), according to an embodiment of the disclosure.

Referring to the FIG. 6B, the disassociation engine (148d) includes a candidate potential estimator (148da) and a dissociation filter module (148db). The candidate potential estimator (148da) receives the data from the learning model (148aa) and the potential candidates table from the data estimation controller (146). The candidate potential estimator (148ca) is configured to determine most promising pair (s) for disassociation. The dissociation filter module (148db) receives input from the association mapper table (148b) and is configured to apply threshold filter for disassociation and checks the association mapper table (148b) to verify if the mappings are already present to mark candidate pair for disassociation. The output of the disassociation engine (148d) is disassociation pairs. For example, a dissociation pair dissociating TAG 1 and the key is provided as (TAG1, key).

Figure 7:
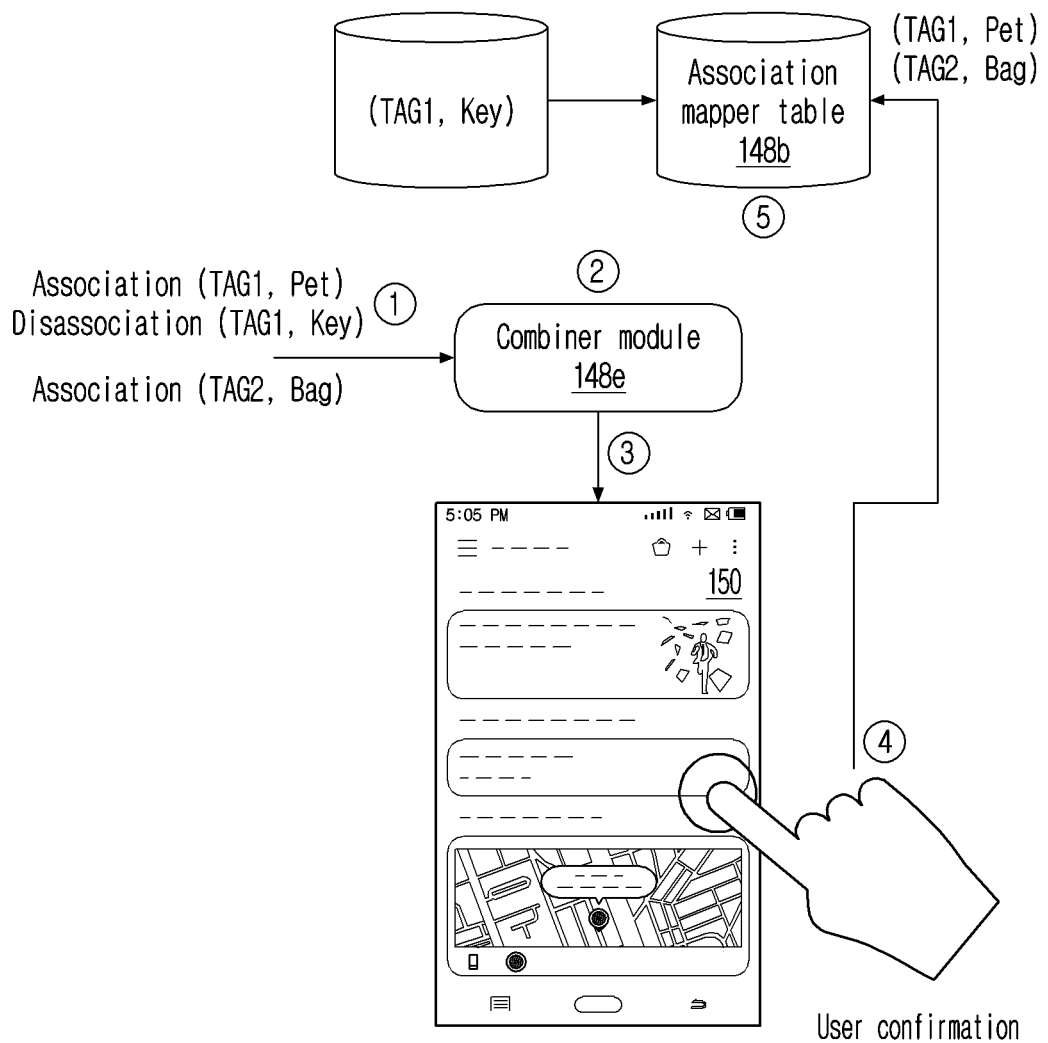
FIG. 7 illustrates the working of a combiner module, according to an embodiment of the disclosure.

FIG. 7 illustrates the working of the combiner module (148e), according to an embodiment of the disclosure.

Referring to FIG. 7, the combiner module (148e) receives the input from the association engine (148c) and the disassociation engine (148d) with the association pairs and the dissociation pairs, respectively. For example, at step 1, consider the input to the combiner module (148e) are dissociate (TAG1, key), associate (TAG2, Bag) and associate (TAG1, Pet).

At step 2, the combiner module (148e) combines data from the association engine (148c) and the disassociation engine (148d) into entries which are then one of added, deleted and updated in the association mapper table (148b). At step 3, the combiner module (148e) sends association suggestion to listening services on the electronic device (100) which is displayed in the form of notification to the user. At step 4, the electronic device (100) receives user input confirming the associating and the dissociation of the objects. At step 5, the association mapper table (148b) is updated using the new association/dissociation data.

FIG. 8 is a flow chart (800) illustrating a method for dynamically associating the UWB tag (1000) with the object, according to an embodiment of the disclosure.

Referring to the FIG. 8, at operation 802, the method includes the electronic device (100) monitoring the first object and the second object in the vicinity of the UWB tag (1000) over the period of time. For example, in the electronic device (100) as illustrated in the FIG. 1A, the UWB tag management controller (140) is configured to monitor the first object and the second object in the vicinity of the UWB tag (1000) over the period of time.

At operation 804, the method includes the electronic device (100) determining the at least one parameter of the plurality of parameters associated with each of the first object and the second object with respect to the UWB tag (1000). For example, in the electronic device (100) as illustrated in the FIG. 1A, the UWB tag management controller (140) is configured to determine the at least one parameter of the plurality of parameters associated with each of the first object and the second object with respect to the UWB tag (1000).

At operation 806, the method includes the electronic device (100) generating the correlation between the UWB tag (1000) and each of the first object and the second object based on the at least one parameter of the plurality of parameters. For example, in the electronic device (100) as illustrated in the FIG. 1A, the UWB tag management controller (140) is configured to generate the correlation between the UWB tag (1000) and each of the first object and the second object based on the at least one parameter of the plurality of parameters.

At operation 808, the method includes the electronic device (100) dynamically associating the UWB tag (1000)

with one of the first object and the second object based on the correlation between the UWB tag (1000) and each of the first object and the second object. For example, in the electronic device (100) as illustrated in the FIG. 1A, the UWB tag management controller (140) is configured to dynamically associate the UWB tag (1000) with one of the first object and the second object based on the correlation between the UWB tag (1000) and each of the first object and the second object.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the disclosure.

Figure 9A:
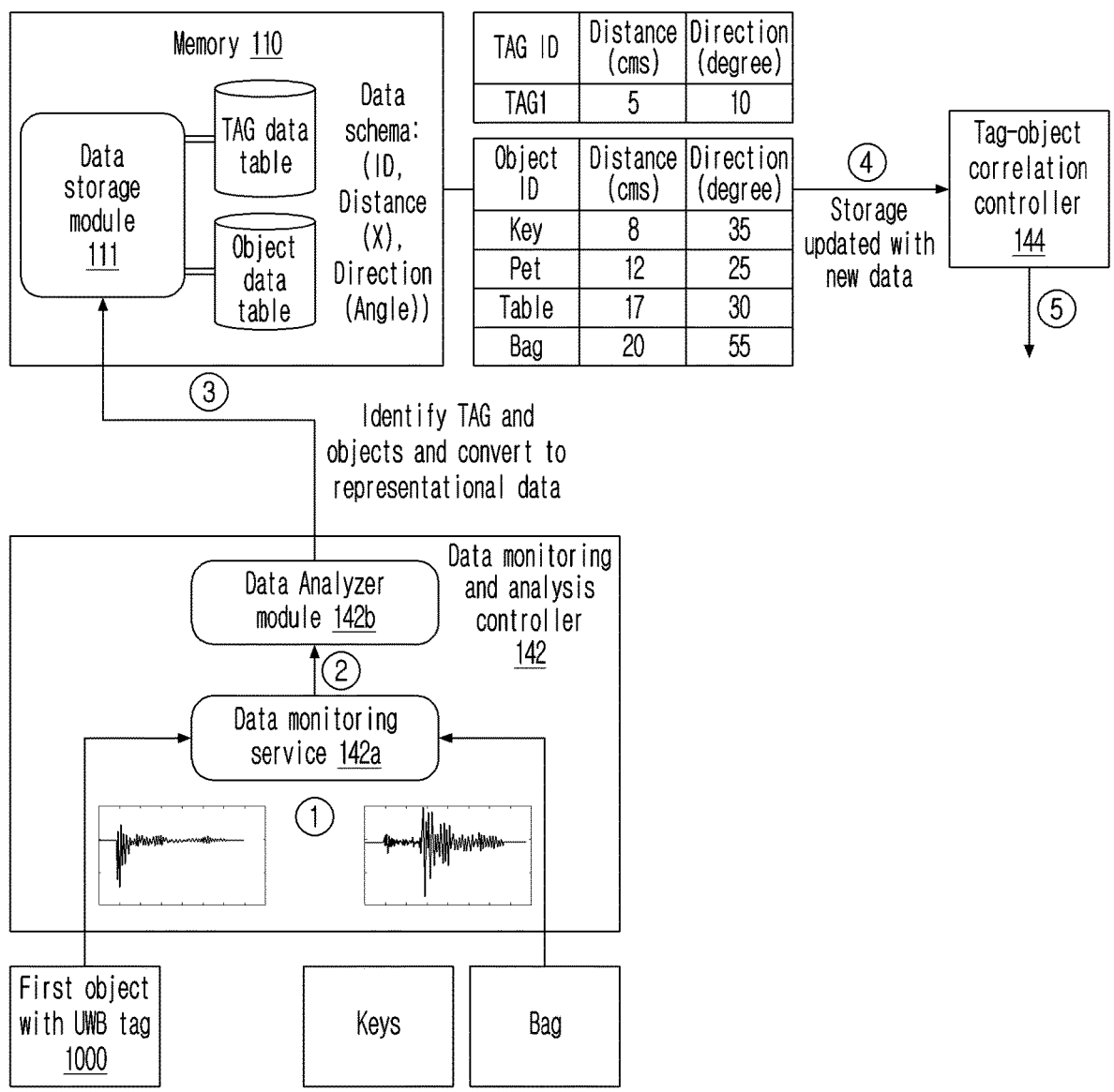
FIGS. 9A and 9B are examples illustrating the dynamic association of the UWB tag to the object by the electronic device, according to various embodiments of the disclosure.
Figure 9B:
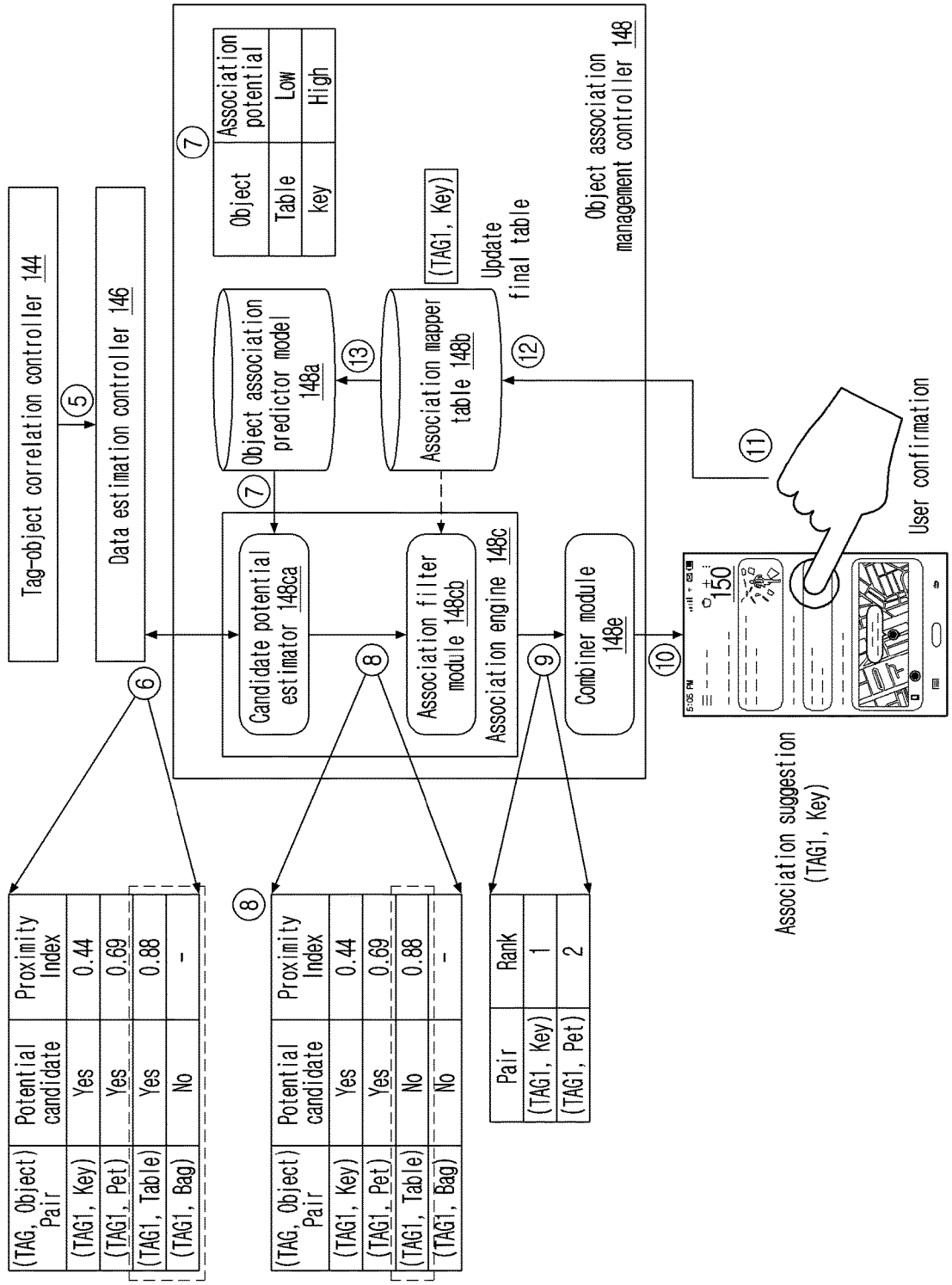

FIGS. 9A and 9B are examples illustrating the dynamic association of the UWB tag (1000) to the object by the electronic device (100), according to various embodiments of the disclosure.

Referring to FIGS. 9A and 9B, at step 1 the data monitoring service (142*a*) receives the reflected UWB signal from each of the first object which has the UWB tag (1000) attached and the multiple second objects i.e., the keys, bag, etc. At step 2, the raw data received from the objects is sent to the data analyzer module (142*b*) which identifies each of the tags and the objects in the vicinity of the electronic device (100). Further, the data analyzer module (142*b*) converts the data related of the identified tags and the objects into representational form and shares the same with the data storage module (111) (as indicated in step 3). The data storage module (111) is updated with the newly identified tag and the objects data and at step 4, the data storage module (111) shares an update to the tag-object correlation controller (144).

At step 5, the tag-object correlation controller (144) generates the relative correlation parameters for each of the (TAG, Object) pairs as provided in Table 8 and shared the relative correlation parameters with the data estimation controller (146).

TABLE 8

| (TAG, Object) Pair | Relative distance (cms) | Relative direction (degree) | (Association duration, Last updated time) |
|---|---|---|---|
| (TAG1, Key) | 3 (8-5) | 25 | (1 day, 10 m ago) |
| (TAG1, Pet) | 7 (12-5) | 15 | (7 hours, 25 m ago) |
| (TAG1, table) | 12 (17-5) | 20 | (5 hours, 28 m ago) |
| (TAG1, Bag) | 15 (20-5) | 45 | (1 hour, 2 days ago) |

At step 6, the data estimation controller (146) identifies potential candidates using threshold values such as for example, distance threshold=12 centimeters, direction threshold=30 degrees, last updated time <30 minutes. Further, the proximity index value is determined for each of the (TAG, object) pairs, as provided in Table 9.

TABLE 9

| (TAG, Object) Pair | Potential candidate | Proximity Index |
|---|---|---|
| (TAG1, Key) | Yes | 0.44 |
| (TAG1, Pet) | Yes | 0.69 |
| (TAG1, Table) | Yes | 0.88 |
| (TAG1, Bag) | No | — |

Based on the Table 9, there is no possibility of the bag being the potential candidate to which the TAG1 is associated. However, there is a possibility based on the proximity index that the table is the potential candidate to which the TAG1 is associated. The data estimation controller (146) sends the potential candidates list to the candidate potential estimator (148*ca*) of the association engine (148*c*). At step 7, the candidate potential estimator (148*ca*) also receives the input from the object association predictor model (148*a*) indicating the association potential of the objects mentioned in the potential candidate list provided by the data estimation controller (146), as indicated in Table 10.

TABLE 10

| Object | Association potential |
|---|---|
| Table | Low |
| Key | High |

At step 8, the candidate potential estimator (148*ca*) determines the list of potential candidates based on the inputs received in the table 9 and the Table 10 to generate the potential candidate list, as shown in Table 11.

TABLE 11

| (TAG, Object) Pair | Potential candidate | Proximity Index |
|---|---|---|
| (TAG1, Key) | Yes | 0.44 |
| (TAG1, Pet) | Yes | 0.69 |
| (TAG1, Table) | No | 0.88 |
| (TAG1, Bag) | No | — |

In the Table 9, the (TAG1, Table) is a potential candidate. However, in the Table 11, the (TAG1, Table) is not a potential candidate based on the association potential provided in the Table 10. At step 9, the potential candidate list is further filtered by the association filter module (148*cb*) to remove unlikely candidates from the list and generates the new list of association, as shown in Table 12.

TABLE 12

| Pair | Rank |
|---|---|
| (TAG1, Key) | 1 |
| (TAG1, Pet) | 2 |

The list of association is sent to the combiner module (148*e*) and at step 10, the combiner module (148*e*) sends the notification indicating the association suggestion of the highest ranked pair (TAG1, Key), which is displayed on the screen of the electronic device (100). At step 11, the user confirmation is received on the screen of the electronic device (100) approving the association suggestion (TAG1, Key) pair and the association of the TAG1 with the key is completed. Further, at step 12 the final table is updated in the association mapper table (148*b*) using the (TAG1, Key) pair and at step 13 the feedback is sent from the association mapper table (148*b*) to the object association predictor model (148*a*).

Figure 10A:
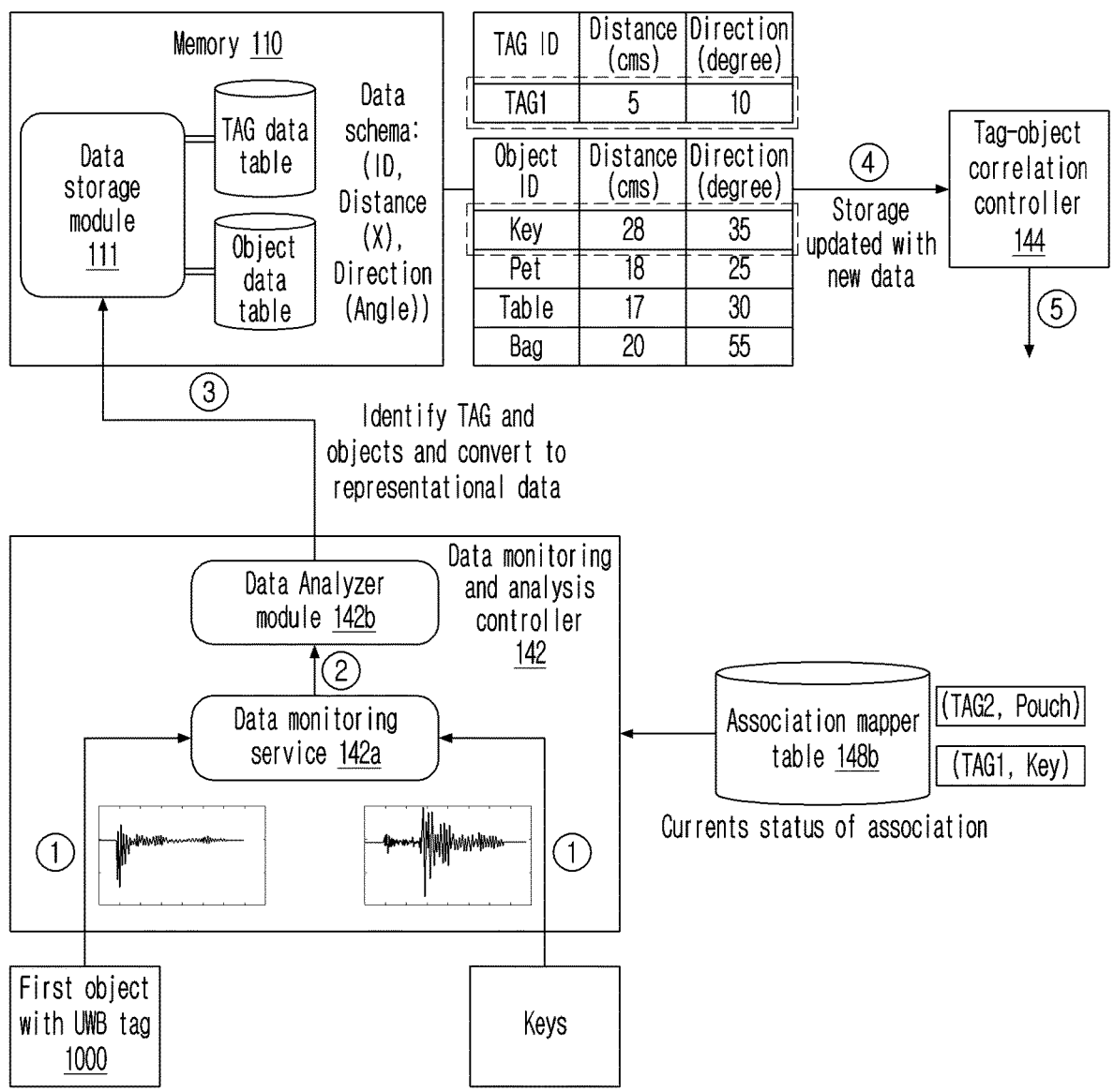
FIGS. 10A and 10B are examples illustrating the dynamic dis-association of the UWB tag to the object by the electronic device, according to various embodiments of the disclosure.
Figure 10B:
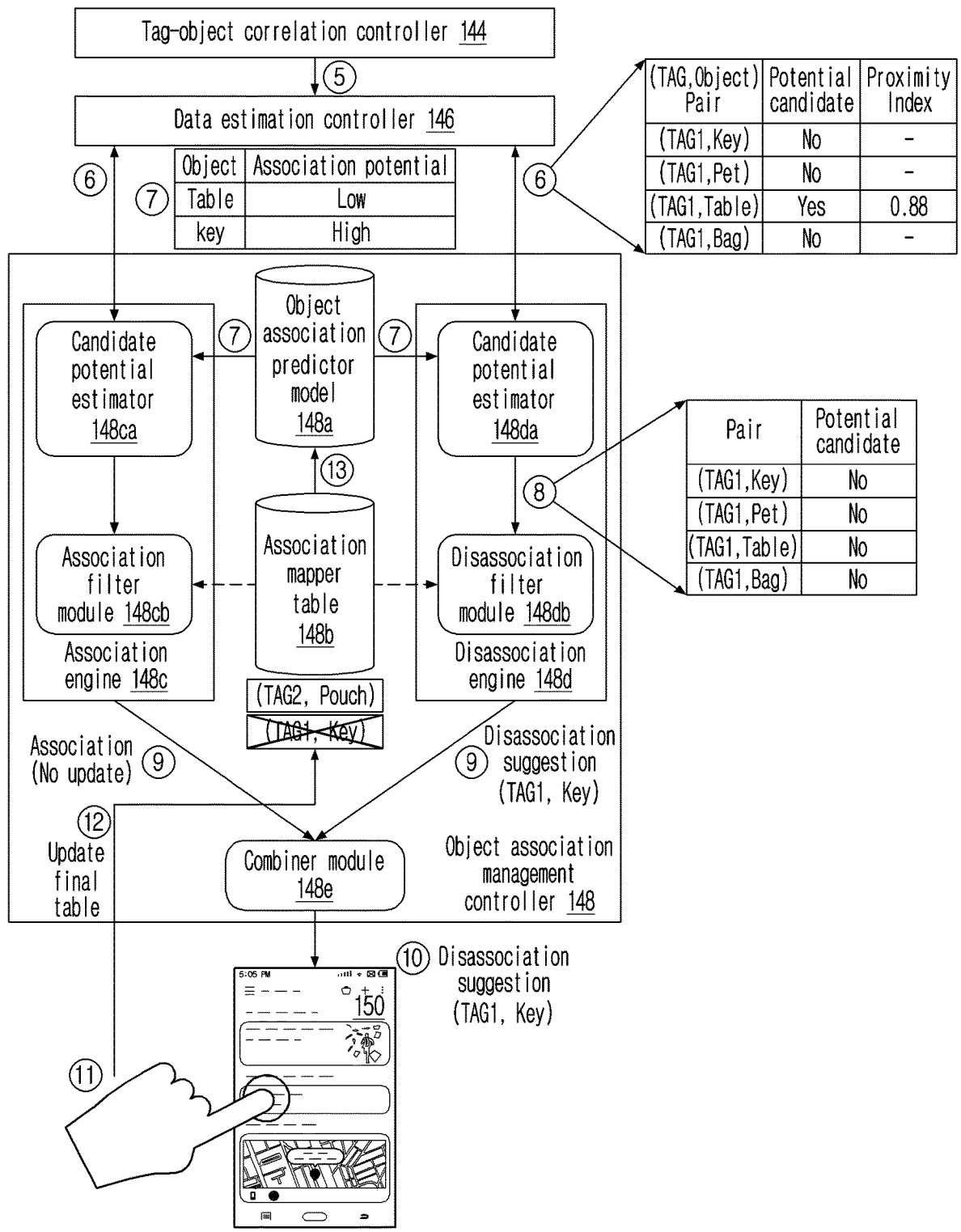

FIGS. 10A and 10B are examples illustrating the dynamic dis-association of the UWB tag (1000) to the object by the electronic device (100), according to various embodiments of the disclosure.

Referring to FIGS. 10A and 10B, at step 1 the data monitoring service (142*a*) receives the reflected UWB signal from each of the UWB tag i.e., TAG1 and the bag. A current status of association the association mapper table (148*b*) includes two tag-object pairs i.e., (TAG1, Key) and (TAG2, Pouch). Consider that the user removes the TAG1 from the key and puts the TAG1 on top of a stationary table. However, the electronic device (100) is not aware of the same. At step 2, the raw data received from the objects is sent to the data analyzer module (142*b*) which identifies each of the tags and the objects in the vicinity of the electronic device (100). Further, the data analyzer module (142*b*) converts the data related of the identified tags and the objects into representational form and shares the same with the data storage module (111) (as indicated in step 3). The data storage module (111) is updated with the newly identified tag and the objects data and at step 4, the data storage module (111) shares an update to the tag-object correlation controller (144), as indicated in table 13 and 14.

TABLE 13

| TAG ID | Distance (cms) | Direction (degree) |
|---|---|---|
| TAG1 | 5 | 10 |

TABLE 14

| Object ID | Distance (cms) | Direction (degree) |
|---|---|---|
| Key | 28 | 35 |
| Pet | 18 | 25 |
| Table | 17 | 30 |
| Bag | 20 | 55 |

At step 5, the tag-object correlation controller (144) generates the relative correlation parameters for each of the (TAG, Object) pairs as provided in Table 15 and shared the relative correlation parameters with the data estimation controller (146).

TABLE 15

| (TAG, Object) Pair | Relative distance (cms) | Relative direction (degree) | (Association duration, Last updated time) |
|---|---|---|---|
| (TAG1, Key) | 23 (28-5) | 25 | (1 day, 10 m ago) |
| (TAG1, Pet) | 13 (18-5) | 15 | (7 hours, 25 m ago) |
| (TAG1, Table) | 12 (17-5) | 20 | (5 hours, 28 m ago) |
| (TAG1, Bag) | 15 (20-5) | 45 | (1 hour, 2 days ago) |

At step 6, the data estimation controller (146) identifies potential candidates using threshold values such as for example, distance threshold=12 centimeters, direction threshold=30 degrees, last updated time <30 minutes. Further, the proximity index value is determined for each of the (TAG, object) pairs, as provided in Table 16.

TABLE 16

| (TAG, Object) Pair | Potential candidate | Proximity Index |
|---|---|---|
| (TAG1, Key) | No | — |
| (TAG1, Pet) | No | — |

TABLE 16-continued

| (TAG, Object) Pair | Potential candidate | Proximity Index |
|---|---|---|
| (TAG1, Table) | Yes | 0.88 |
| (TAG1, Bag) | No | — |

Based on the Table 16, there is no possibility of the key being the potential candidate to which the TAG1 is associated. However, there is a possibility based on the proximity index that the table is the potential candidate to which the TAG1 is associated. The data estimation controller (146) sends the potential candidates list to the candidate potential estimator (148*ca*) of the association engine (148*c*) and the candidate potential estimator (148*da*) of the dissociation engine (148*d*). At step 7, the candidate potential estimator (148*ca*) of the association engine (148*c*) and the candidate potential estimator (148*da*) of the dissociation engine (148*d*) also receive the input from the object association predictor model (148*a*) indicating the association potential of the objects mentioned in the potential candidate list provided by the data estimation controller (146).

At step 8, the candidate potential estimator (148*da*) determines the list of potential candidates based on the inputs received in the table 16 to generate the potential candidate list, as shown in Table 17.

TABLE 17

| (TAG, Object) Pair | Potential candidate |
|---|---|
| (TAG1, Key) | No |
| (TAG1, Pet) | No |
| (TAG1, Table) | No |
| (TAG1, Bag) | No |

In the Table 17, the (TAG1, key) is not a potential candidate based on the association potential. At step 9, the potential candidate list is further filtered by the association filter module (148*db*) to remove unlikely candidates from the list and generates the new list of association which is sent to the combiner module (148*e*) and at step 10, the combiner module (148*e*) sends the notification indicating the dissociation suggestion (TAG1, Key), which is displayed on the screen of the electronic device (100). At step 11, the user confirmation is received on the screen of the electronic device (100) approving the dissociation suggestion (TAG1, Key) pair and the No of the TAG1 from the key is completed. Further, at step 12 the final table is updated in the association mapper table (148*b*) using the (TAG1, Key) pair and at step 13 the feedback is sent from the association mapper table (148*b*) to the object association predictor model (148*a*).

The foregoing description of the specific embodiments will so fully reveal the general nature of the embodiments herein that others can, by applying current knowledge, readily modify and or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method for dynamically associating an ultra wide band (UWB) tag with an object by an electronic device, the method comprising:
monitoring, by the electronic device, a first object and a second object in a vicinity of the UWB tag over a period of time;
determining, by the electronic device, at least one parameter of a plurality of parameters associated with each of the first object and the second object with respect to the UWB tag;
generating, by the electronic device, a correlation between the UWB tag and each of the first object and the second object based on the at least one parameter of the plurality of parameters associated with each of the first object and the second object with respect to the UWB tag; and
dynamically associating, by the electronic device, the UWB tag with one of the first object or the second object based on the correlation between the UWB tag and each of the first object and the second object.

2. The method of claim 1, wherein the at least one parameter of the plurality of parameters with respect to the UWB tag comprises:
a distance between the UWB tag and the first object,
a distance between the UWB tag and the second object,
positional data of the first object with respect to the UWB tag, or
positional data of the second object with respect to the UWB tag.

3. The method of claim 2, wherein the monitoring, by the electronic device, of the first object and the second object in the vicinity of the UWB tag over the period of time comprises:
determining, by the electronic device, the positional data of the first object with respect to the UWB tag and the positional data of the second object with respect to the UWB tag using UWB signals,
identifying, by the electronic device, the first object and the second object in the vicinity of the UWB tag using the determined positional data of the first object with respect to the UWB tag and the determined positional data of the second object with respect to the UWB tag, and
monitoring, by the electronic device, the first object and the second object in the vicinity of the UWB tag over the period of time.

4. The method of claim 3, wherein the determining, by the electronic device, of the positional data of the first object with respect to the UWB tag and the positional data of the second object with respect to the UWB tag using UWB signals comprises:
transmitting, by the electronic device, a UWB radar pulse in the vicinity of the UWB tag,
receiving, by the electronic device, a reflected UWB radar pulse from each of the first object and the second object,
computing, by the electronic device, a distance value measured from the electronic device, and a direction value measured from the electronic device using a time of flight value between the transmitted UWB radar pulse and the reflected UWB radar pulses, and
determining, by the electronic device, the positional data of the first object with respect to the UWB tag and the positional data of the second object with respect to the UWB tag using the UWB signals.

5. The method of claim 3, wherein the identifying, by the electronic device, of the first object and the second object in the vicinity of the UWB tag using the determined positional data of the first object with respect to the UWB tag and the positional data of the second object with respect to the UWB tag comprises:
extracting, by the electronic device, one or more features from a reflected UWB radar pulse from each of the first object and the second object,
providing, by the electronic device, the one or more features as an input to a first pre-trained model,
determining, by the electronic device, an identification value for each of the first object and the second object based on the output of the first pre-trained model, and
identifying, by the electronic device, the first object and the second object in the vicinity of the UWB tag based on the identification values.

6. The method of claim 1, further comprising storing a tag and the at least one parameter of each of the first object and the second object as a (Tag, Object Pair) entry in a TAG object correlation table.

7. The method of claim 1, wherein the generating, by the electronic device, of the correlation between the UWB tag and each of the first object and the second object based on the at least one parameter of the plurality of parameters comprises:
determining, by the electronic device, a rank each of the first object and the second object for association with the UWB tag based on the determined at least one parameter of the plurality of parameters, and
generating, by the electronic device, the correlation between the UWB tag and each of the first object and the second object based on the rank of each of the first object and the second object for association with the UWB tag.

8. The method of claim 7, wherein dynamically associating, by the electronic device, the UWB tag with one of the first object or the second object based on the correlation between the UWB tag and each of the first object and the second object comprises:
computing, by the electronic device, a proximity index value between the UWB tag and each of the first object and the second object based on the at least one parameter of the plurality of parameters with respect to the UWB tag and the correlation between the UWB tag and each of the first object and the second object,
determining, by the electronic device, a likelihood of association of the UWB tag with each of the first object and the second object based on the proximity index value between the UWB tag and each of the first object and the second object, and
dynamically associating, by the electronic device, the UWB tag with one of the first object or the second object based on the likelihood of association.

9. The method of claim 8, wherein at least one of the first object or the second object is identified as a potential candidate for dynamic association based on the proximity index.

10. The method of claim 8, wherein the ranks are ordered based on the proximity indexes of the first object and the second object.

11. The method of claim 8, wherein the computing, by the electronic device, of the proximity index value between the UWB tag and the first object and the second object based on the positional data comprises:

determining, by the electronic device, a first difference between the distance value of the UWB tag and the distance value of each of the first object and the second object, the first difference indicating a relative distance value, determining, by the electronic device, a second difference between the direction value of the UWB tag and the direction value of each of the first object and the second object, the second difference indicating a relative direction value, determining, by the electronic device, a time duration of association of the UWB tag with each of the first object and the second object and a previous updated time of the association, determining, by the electronic device, a weighted average of the relative distance value, the relative direction value, the time duration of association, and the previous updated time of the association of the UWB tag with each of the first object and the second object and the previous updated time of the association, and computing, by the electronic device, the proximity index value between the UWB tag and each of the first object and the second object based on the determined weighted average.

12. The method of claim 8, wherein the determining, by the electronic device, of the likelihood of association of the UWB tag with each of the first object and the second object based on the proximity index comprises:

providing, by the electronic device, the positional data of the UWB tag, the positional data of the first object and the second object, the identification values of the first object and the second object, and an association history of the UWB tag as an input to a second pre-trained model, and determining, by the electronic device, the likelihood of association of the UWB tag with each of the first object and the second object by the second pre-trained model.

13. The method of claim 8, wherein dynamically associating, by the electronic device, of the UWB tag with one of the first object or the second object based on the correlation between the UWB tag and each of the first object and the second object comprises:

detecting, by the electronic device, an absence of association of the first object with the UWB tag, and dynamically associating, by the electronic device, the UWB tag with the second object comprising a highest rank.

14. The method of claim 8, further comprising:

obtaining, by the electronic device, an identification value of one of the first object or the second object which is currently associated with the UWB tag, identifying, by the electronic device, an absence of one of the first object or the second object which is currently associated with the UWB tag based on the rank and the proximity index value, and dynamically dissociating, by the electronic device, one of the first object or the second object which is currently associated with the UWB tag.

15. The method of claim 8, wherein dynamically associating, by the electronic device, of the UWB tag with one of the first object or the second object based on the correlation between the UWB tag and each of the first object and the second object comprises:

obtaining, by the electronic device, an identification value of one of the first object or the second object which is currently associated with the UWB tag, identifying, by the electronic device, whether the identification value of one of the first object or the second object which is currently associated with the UWB tag is the same as or different from the identification value of a physical object with a highest rank, determining, by the electronic device, a disassociation of the UWB tag with one of the first object or the second object which is currently associated with the UWB tag based on the identification, and dynamically associating, by the electronic device, the UWB tag with the physical object with the highest rank, wherein the physical object with the highest rank is one of the first object or the second object which is currently not associated with the UWB tag.

16. The method of claim 15, further comprising:

providing, by the electronic device, a notification to a user indicating the association of the UWB tag with the physical object with the highest rank and the disassociation of the UWB tag with one of the first object or the second object which is currently associated with the UWB tag;

receiving, by the electronic device, a user input comprising a validation of the association of the UWB tag with the physical object with the highest rank and the disassociation of the UWB tag with one of the first object or the second object which is currently associated with the UWB tag; and updating, by the electronic device, at least one of the association of the UWB tag or the disassociation of the UWB tag based on the user input.

17. An electronic device for dynamically associating an ultra wide band (UWB) tag with an object, the electronic device comprising:

a memory;

a processor coupled to the memory;

a communicator coupled to the memory and the processor; and an UWB tag management controller coupled to the memory, the processor, and the communicator, wherein the UWB tag management controller is configured to:

monitor a first object and a second object in a vicinity of the UWB tag over a period of time, determine at least one parameter of a plurality of parameters associated with each of the first object and the second object with respect to the UWB tag, generate a correlation between the UWB tag and each of the first object and the second object based on the at least one parameter of the plurality of parameters associated with each of the first object and the second object with respect to the UWB tag, and dynamically associate the UWB tag with one of the first object or the second object based on the correlation between the UWB tag and each of the first object and the second object.

18. The electronic device of claim 17, wherein the at least one parameter of the plurality of parameters with respect to the UWB tag comprises:

a distance between the UWB tag and the first object, a distance between the UWB tag and the second object, a positional data of the first object with respect to the UWB tag, or a positional data of the second object with respect to the UWB tag.

* * * * *